Figure 1:
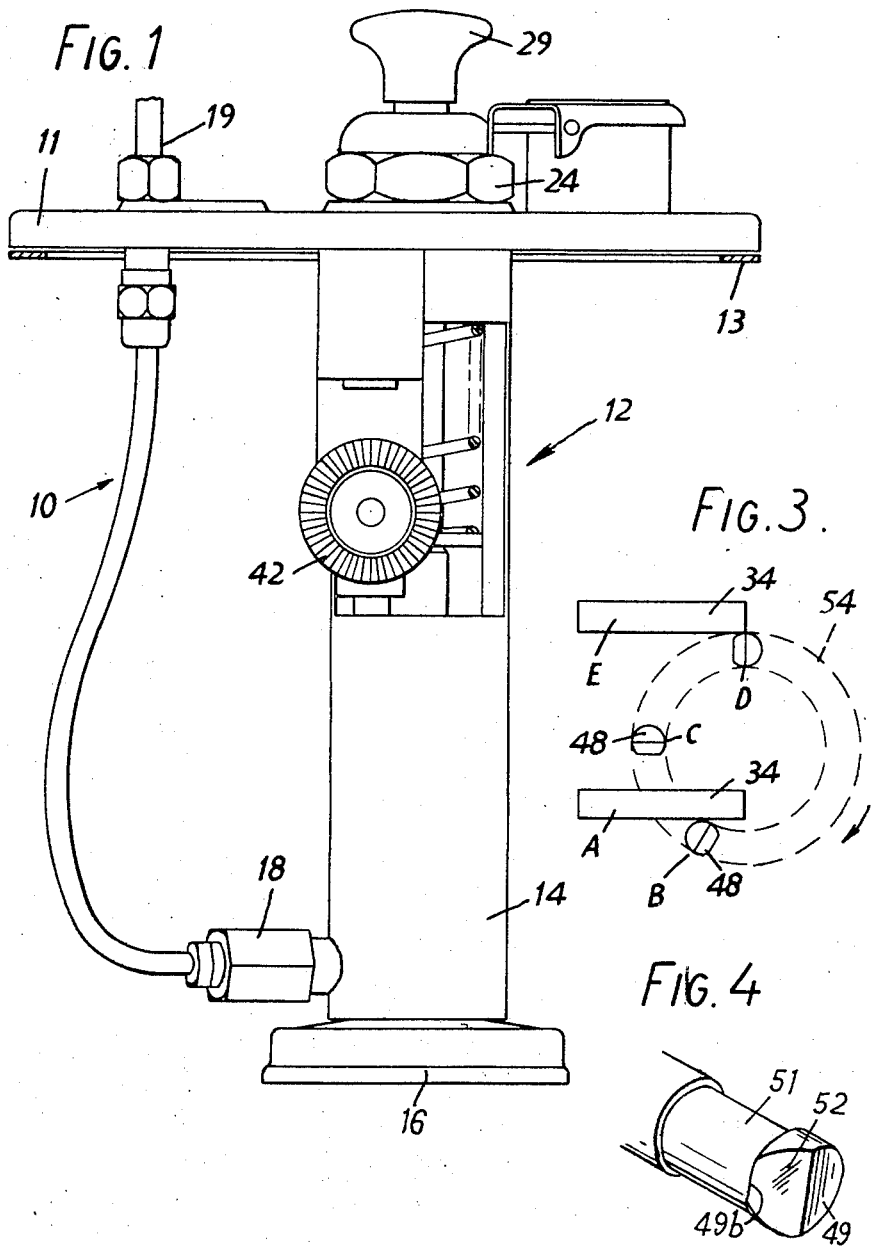

United States Patent [19]
Grantham

[11] 3,793,902
[45] Feb. 26, 1974

[54] DRIVE ARRANGEMENT

[75] Inventor: Max Edward Grantham, Plympton, Plymouth Devon, England

[73] Assignee: Tecalemit (Engineering) Limited, Devon, England

[22] Filed: Oct. 18, 1972

[21] Appl. No.: 298,610

[30] Foreign Application Priority Data
Oct. 18, 1971 Great Britain.................... 48445/71

[52] U.S. Cl......................... 74/50, 92/129, 417/471
[51] Int. Cl.............................................. F16h 21/18
[58] Field of Search.... 74/50; 92/129; 417/470, 471

[56] References Cited
UNITED STATES PATENTS
853,707   5/1907   Margadant............................. 74/50
2,957,420  10/1960  Reynolds et al...................... 92/129
1,904,799   4/1933  Palmer................................ 417/471
3,545,896  12/1970  Zahradnik........................... 417/471

*Primary Examiner*—Benjamin W. Wyche
*Assistant Examiner*—Wesley S. Ratliff, Jr.

[57] ABSTRACT

A drive arrangement for converting rotary motion to linear motion in which a rotating member co-operates with a co-operating member on a follower member, the follower moving along a line transverse to the axis of rotation of the rotating member and the co-operating member moving transversely both to the line and the axis of rotation.

2 Claims, 6 Drawing Figures

DRIVE ARRANGEMENT

BACKGROUND OF THE INVENTION

The invention relates to drive arrangements for converting rotary motion to linear motion. Drive arrangements are known having a rotatable member rotatable about an axis, said rotatable member including a first co-operating member spaced from said axis, a follower member mounted for movement along a line transverse to said axis, said follower member including a second co-operating member, the first and second co-operating members co-operating with one another so that as the rotatable member rotates and the first co-operating member describes a circular path about said axis the second co-operating member moves the follower member along said line.

An example of this kind of drive arrangement is a pin and slot drive arrangement, the pin being carried by the rotatable member and forming said first co-operating member and the slot comprising the second co-operating member being carried by a member restrained to move linearly. In a second example the slot may be open on one side and thus be provided by a cam surface on the follower member so that the pin can only move the follower member in one direction along said line in which case the follower member might be moved in the other direction by a resilient member. In a third example, it may be arranged that when the follower member begins to move in the other direction the pin becomes disengaged from the cam surface to allow the resilient member alone to control the movement of the follower member in said other direction.

In all of these arrangements there are considerable friction losses between the pin and the slot or cam surface. The friction losses are small when the pin is moving approximately transversely to the slot or cam surface, but when at another point on its path it is moving approximately parallel thereto considerable friction losses result. Also, in certain uses of such a drive arrangement such as when the pin is rotated about the axis slowly, it has been found that when the pin is moving approximately parallel to the slot or cam surface that "stick-slip" occurs. This is the phenomena in which the pin will not move across the slot or cam surface until sufficient torque has been built up when it suddenly moves quickly for a short distance until it sticks relative to the surface once again. Thus, the pin moves across the surface in a series of jerks. This causes irregularities in the drive and hence excessive wear and also requires that, for rotating the rotatable member, a motor of higher power than would otherwise be necessary is required.

SUMMARY OF THE INVENTION

It is an object of the present invention to provide a drive arrangement in which friction losses are considerably reduced.

It is a further object of the present invention to provide a drive arrangement in which "stick-slip" does not occur.

According to the present invention there is provided a drive arrangement for converting rotary motion to linear motion comprising a rotatable member rotatable about an axis and having a first co-operating member spaced from said axis, a follower member mounted for movement along a line transverse to said axis, said follower member including a second co-operating member movable generally transversely of said line and of said axis with said first co-operating member, the first and second co-operating members co-operating with one another so that, as the rotatable member rotates and the first co-operating member describes a circular path about said axis, the second co-operating member moves the follower member along said line.

Accordingly, in the drive arrangement according to the present invention no relative movement between the two co-operating members takes place except a rolling motion so that frictional losses between the two co-operating members are reduced. Preferably the follower member and the second co-operating member are fixed relative to one another. This may be arranged by providing the follower member in the general form of a shaft extending along said line and rotatable about its axis to provide the movement of the second co-operating member attached thereto generally transversely to said line and said axis. The shaft may be mounted in bearings.

In the case where the first co-operating member is provided by a pin and the second co-operating member is in the form of a cam surface, the pin bearing against the cam surface to move the follower member in one direction along said line, and biassing means being provided to move the follower member in the opposite direction, the biassing means may be in the form of a coil spring. If the follower member is in the form of a shaft then it may be coaxially mounted with the coil spring, the coil spring bearing on the shoulder of the shaft so that movement of the cam surface generally transversely of said line and the axis may cause the coil spring to wind up or unwind.

The drive arrangement is suitable for application to a piston pump and the invention therefore also provides a pump including a drive arrangement as aforesaid in which the follower member is connected to the piston of the pump. In this case, the follower member in the form of the piston may easily rotate about its axis since there will be little friction between the piston and the cylinder walls.

Figure 2:
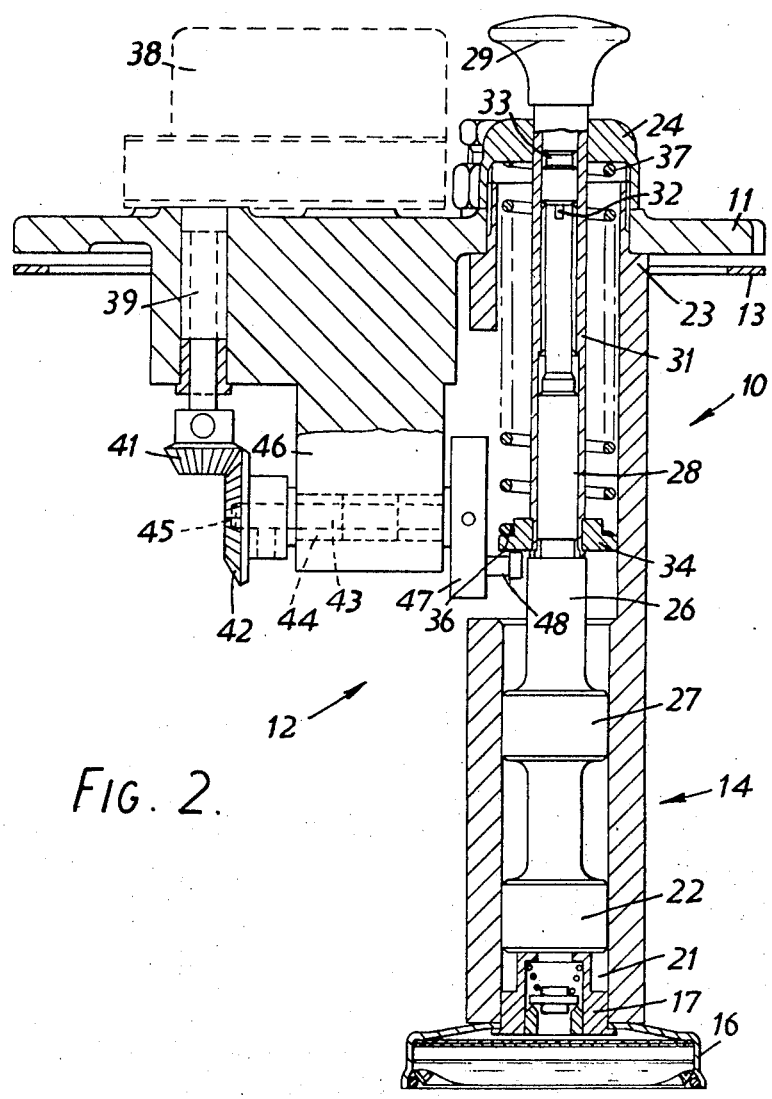
Figure 5:
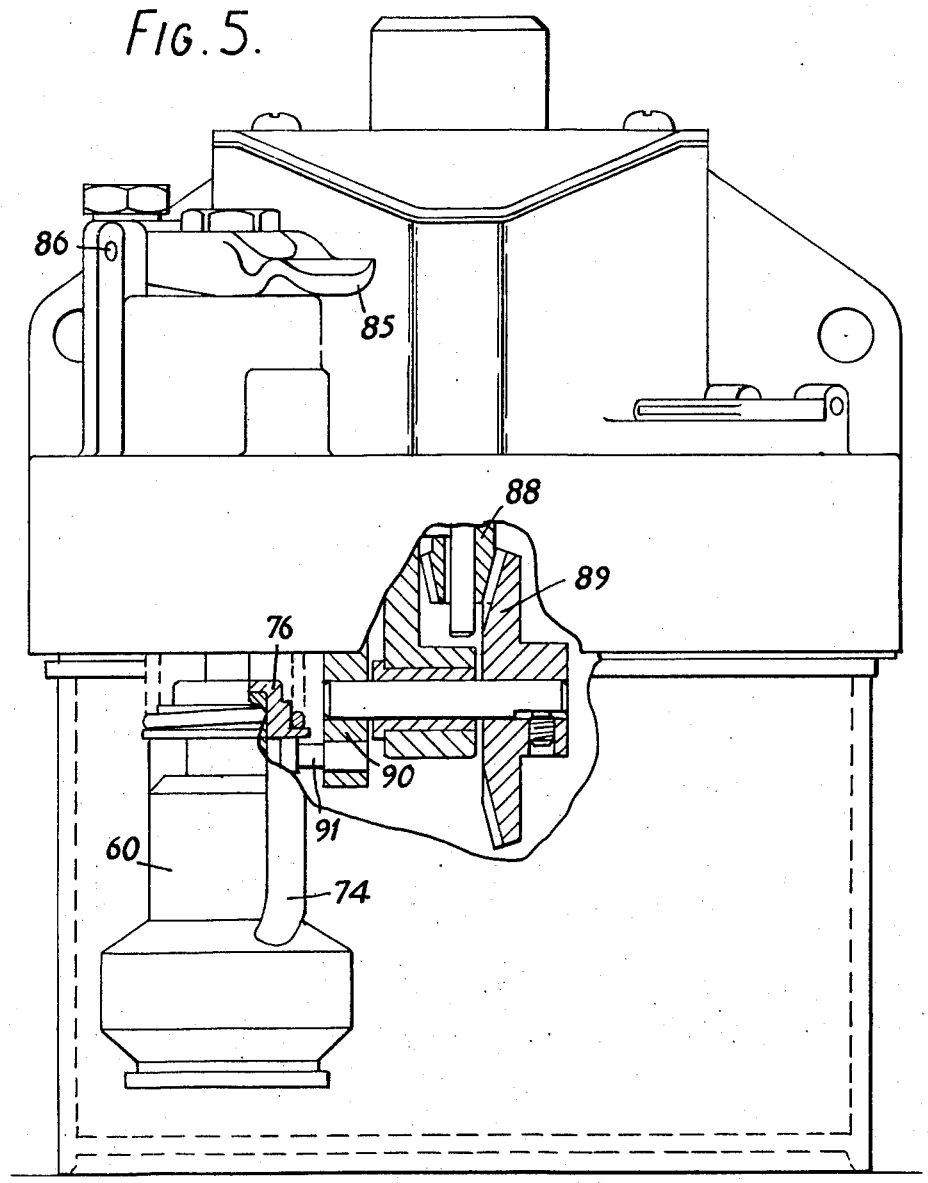
Figure 6:
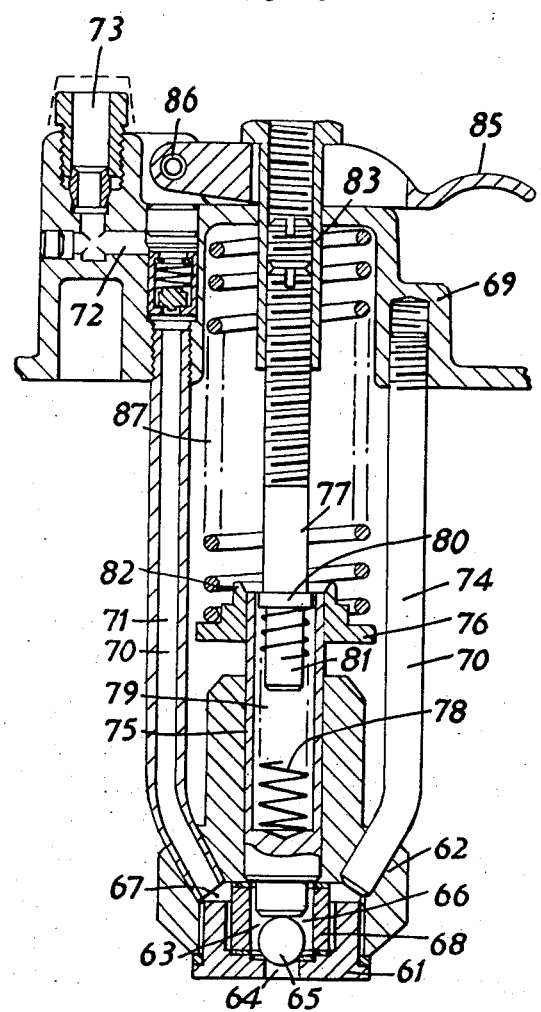

Piston pumps having drive arrangements incorporating preferred embodiments of the invention will now be described by way of example only and with reference to the accompanying drawings in which:

FIG. 1 is a general view of a pump;
FIG. 2 is a cross-section of the pump of FIG. 1;
FIG. 3 is a diagram of the principle of operation of the drive system of the pump;
FIG. 4 is a perspective view of the pin;
FIG. 5 is a front view, partly in section, of another pump; and
FIG. 6 is a cross-section of the pump body of the pump of FIG. 5.

Referring to FIGS. 1 and 2, the pump 10 shown in FIG. 1 is designed for use with a central lubrication system in which the pump forces lubricant through a network of pipes to various parts of the machine, such as a printing or a textile machine, to which it is attached. The pump 10 is mounted on a lid 11 of a lubricant reservoir (not shown), the pump body 12 extending downwardly from the lid 11 into the lubricant. A seal 13 is provided for sealing the lid 11 to the reservoir. The pump body 12 includes a cylinder barrel 14 to the bottom of which is attached a removable filter housing and element 16. The lower end of the cylinder barrel 14 extends into the lubricant so that the lubricant can flow through the housing 16 into the cylinder barrel 14. The lower end of the cylinder barrel above the filter housing 16 is closed by one-way inlet valve 17 which allows lubricant to enter but not to leave the cylinder barrel 14. A fluid outlet 18 is also provided on one side of the lower end of the cylinder barrel 14. Fluid outlet 18 includes a one-way valve which allows lubricant to flow from but not into the cylinder barrel 14. The fluid outlet 18 is connected by a flexible tube to an outlet nipple 19 situated in the lid 11 of the pump. The cylinder barrel 14 provides a pumping chamber 21 in which is situated a piston 22. The upper half of the pump body 12 above the cylinder barrel 14 is cut away so as to have a semi-circular cross-section, this part of the pump body 12 providing a support bracket for the cylinder barrel. The upper end of the pump body 12 is rigidly connected to the lid 11, the lid 11 being situated between a shoulder 23 on the pump body 12 and a lock nut 24 above the lid. Lock nut 24 is threaded on to the threaded upper end of the pump body 12.

A piston rod 26 extends upwardly from the piston 22 and incorporates a second piston 27 in the cylinder barrel 14 which acts as a back-up piston. The two pistons 22, 27 act as bearings for maintaining the piston rod 26 in an upright position. The upper end of the piston rod 26 engages the lower end of a follower member in the form of a tubular sleeve 28 which passes upwardly through the lid 11 and the lock nut 24 with which it slidingly engages. The upper end of the sleeve 28 carries a hand knob 29. As will be seen from FIG. 2 of the drawings the upper end of the piston rod 26 is surrounded by the sleeve 28. The sleeve 28 is internally threaded at 31 and threadingly engages the upper end of the piston rod 26. The top end of the piston rod carries a screw slot 32 which allows the piston rod to be rotated by a screwdriver inserted through a passageway passing through the hand knob 29. Rotation of the piston rod by the screwdriver moves the piston rod 26 upwardly or downwardly relative to the sleeve 28. The screw slot 32 is normally protected by a grub screw 33.

Rigidly attached to the bottom end of the sleeve 28 and surrounding the sleeve is an annular drive plate 34. The drive plate 34 is clamped to the sleeve 28 and the swaged end of the sleeve 28. The upper surface of the drive plate 34 carries a spring seat 36. A coil spring 37 extends between this spring seat 36 through the lid 11 to abut the underside of the lock nut 24. The coil spring 37 thereby biasses the piston assembly (which comprises pistons 22, 27, piston rod 26, sleeve 28, drive plate 34, hand knob 29) downwardly until the piston 22 abuts the upper surface of the one-way inlet valve 17.

It will be appreciated that all of the piston assembly is mounted so as to be freely rotatable about the axis of the piston rod 26 except for a slight restoring force provided by the coil spring 37. The coil spring 37 is chosen so as to provide a very low restoring force, that is, the spring can readily be wound up by rotation of the drive plate 34.

Referring to FIGS. 1, 2 and 3, drive means are provided to lift the piston against the bias of the coil spring 37. The drive means comprises an electric motor 38 mounted on the top of the lid 11, a drive output shaft 39 of the motor 38 passing downwardly through the lid 11 in suitable bearings and carrying at its lower end a gear wheel 41. The gear wheel 41 meshes with a further gear wheel 42 which drives a substantially horizontal shaft 43. Shaft 43 extends towards the pump body 12 and is suitably journalled in bearings 44 in a bracket 46 depending from the lid 11. At its end closest the pump body 12, the drive shaft 43 carries a transverse block 47 keyed thereto so as to be rotatable with the drive shaft 43. The transverse block 47 carries a pin 48 spaced from the axis 45 of rotation of the drive shaft 43, the pin projecting towards the piston rod 26. As shown in FIG. 2 the piston assembly is in its lowermost position and the pin rotated about the axis 45 of the drive shaft 43 so as to be in its lowermost position, the pin 48 is situated and extends just below the lowermost surface of the drive plate 34. As can be seen from FIG. 1 it will be noted that the axis 45 of the drive shaft 43 is offset from the axis of the piston rod 26, the direction of rotation of the drive shaft 43 being such that the pin 48 is moved towards the axis of the piston rod 26 during the lower half of its rotary motion about the axis of the drive shaft 43 and moves away from the axis of the piston rod 26 during the upper part of this motion.

Reffering to FIGS. 1, 2 and 4, the shape of the pin 48 is shown more clearly in FIG. 4. The pin comprises a rod of circular cross-section rigidly mounted in the transverse block 47 the end portion 49 of which is of slightly larger diameter than the adjacent inwardly disposed portion 51. The portion 49 is relieved by a flat surface 52 extending from a diameter 49a on the outer end face of portion 49 to a chord 49b on inner end face of portion 49, the chord 49b being parallel to diameter 49a. Flat surface 52 subtends an angle of 45° with the longitudinal axis of pin 48. The pin 48 is mounted in the transverse block 47 so that the plane of the flat surface 52 is substantially vertical when the pin 48 is in its uppermost or lowermost position as the drive shaft 43 rotates, the flat surface 52 being provided on the side of the pin facing away from the direction of its rotation.

The mode of operation is as follows. The oil level in the reservoir is above the level of the filter housing 16 and thus when the piston 22 is raised oil is drawn into the pumping chamber 21 through the one-way inlet valve 17. When the piston then moves downwardly the oil in the pumping chamber 21 is forced out of the outlet 18 to the outlet nipple 19 and thence to the lubricating system. Upward movement of the piston 22 is caused by the drive system and downward movement of the piston 22 is caused by the spring 37. It will be appreciated that since oil is being pumped the two pistons 22 and 27 are continuously lubricated and that very little friction loss can occur between the pistons and the cylinder barrel.

The operation of the drive system will now be described in more detail. Referring to FIGS. 1, 2 and 3, the motor 38 is continuously driven and rotates the drive shaft 43 via the output shaft 39 and the gears 41, 42. The motor 43 is arranged to rotate very slowly since for most applications it is necessary only to pump oil infrequently since each bearing only requires a small quantity of oil over a period of time. Rotation of the drive shaft 43 causes rotation of the transverse block 47 and hence causes movement of the pin 48 around a circular path. The circular path 54 of the pin 48 is shown in FIG. 3 which illustrates diagrammatically the method of engagement of the pin 48 with the drive plate 34. Drive plate 34 accordingly acts as a cam member. Considering FIG. 3, it will be seen that the lowermost position of the drive plate 34 is illustrated at A, that is when the piston 22 is bearing on the inlet valve 17. The pin 48 is rotated by the drive shaft 43 so as to pass under the drive plate 34 in its lowermost position, the pin 48 first contacting the underside of the drive plate 34 at the point B. As the pin 48 continues to rotate about the axis 45 it lifts the drive plate 34, which further compresses the coil spring 37. At the same time it will be appreciated that the pin 48 moves across the plane of the drive plate 34. Hitherto, this has caused stick-slip problems as noted above which are particularly accentuated since the movement is very slow giving the pin every opportunity to stick. It will be appreciated, however, that as the pin 48 moves across the plate of the drive plate 34 in the present embodiment, the drive plate 34 can move with the pin 48 since it is substantially freely mounted so as to be rotatable about the axis of the piston rod 26. Thus, as the pin moves from the position in which it contacts the plate 34 at B up to a position C, the drive plate 34 rotates about the axis of the piston rod so that substantially the same point of the drive plate 34 remains in contact with the pin 48. There is, however, a rolling motion of the pin 48 across the surface of the drive plate 34 so that the pin 48 will be displaced slightly across the drive plate 34. During this rotation of the drive plate 34 by the pin, the coil spring 37 is slightly wound or unwound as the case may be. During movement of the pin from position C to position D, the drive plate will rotate back substantially to its original position unwinding or winding the coil spring so as to restore it to substantially its original position.

It will be appreciated that whilst previous arrangements have been designed to reduce the friction between the pin 48 and the drive plate 34, for example, by providing the pin 48 in the form of a roller and allowing the roller to roll across the surface of the drive plate 34, the present arrangement provides a fundamentally different solution, that is, mounting the drive plate 34 so as to be movable in its own plane with the pin 48 and thereby eliminating the friction losses between these two parts.

As has been stated above, the movement of the pin about its circular path 54 is very slow and if the pin were allowed to remain in contact with the drive plate 34 during the pumping stroke, there is a likelihood that no pressure would be developed during this pumping stroke since movement of the piston 22 during the pumping stroke would be so slow that a lubricant pressure would not be built up. Thus, at the point D the pin moves away from the drive plate 34. This allows the drive plate 34 to move from its uppermost position E to which it has been raised by the pin 48 just before reaching position D, back to position A under the influence of the coil spring 37 which has been further compressed. If the end portion 49 of pin 48 had a simple cylindrical shape, then drive plate 34 would be in contact with the pin 48 for a short distance after the position D is reached i.e. at the beginning of the downward stroke of drive plate 34. Accordingly, the pin 48 would tend to slow down the piston assembly at the start of the downward stroke and pin 48 would be subject to a force tending to move it more quickly round its circular path. However since the end portion 49 is relieved by the surface 52, then the drive plate 34, driven by coil spring 37, drops cleanly past pin 48 when the latter reaches position D The pin 48 then continues to travel around its circular path 54 from position D until it contacts the drive plate 34 at B when the cycle repeats. It will be appreciated that even if the extent of winding or unwinding of the spring is not successively the same from position B to position D of the pin 48 the spring can restore itself to normal whilst the drive plate is moving from position E to position A.

The manner in which the sleeve 28 can be moved relative to the piston rod 26 has been described above. In FIG. 2 the sleeve is shown in its lowermost position but the sleeve may be lifted relative to the piston rod 26 and thus will also lift the drive plate 34 relative to the piston rod. The effect of this is to raise the lowermost position of drive plate 34, that is, its position when the piston 22 abuts the valve 17. Thus in FIG. 3 the position A is raised of the drive plate 34 somewhat. In this case it will be seen that the pin 48 will not contact the drive plate 34 until further around its circular path 54 and thus the drive plate 34 will not be moved such a great distance and the stroke of the pump will be correspondingly reduced.

Whilst the above arrangement operates quite satisfactorily it will be appreciated that the motor is idling for approximately half the time from the position D of the pin 48 to the position B. A second pin may therefore be provided on the transverse block 47 diametrically opposite the first pin 48 and disposed similarly to the first pin. In this case when the first pin has passed position D the second pin will be approaching position D and will immediately start to raise the drive plate 34 and thence the pistons. In this case the speed of the motor can be halved so that a smaller capacity motor can be used. This provides a further saving in cost.

It will be appreciated that since the pin 48 is acting on one side of the drive plate 34 there is a couple on the piston assembly and partly for this reason two pistons 22 and 27 are spaced apart to counteract this couple. At the same time the piston 27 can act as a back-up piston the piston 22.

The pump shown in FIGS. 5 and 6 is similar to that shown in FIGS. 1 and 2 except in certain respects to be described below.

Referring to FIGS. 5 and 6, a pump comprises a cylinder barrel 60 having an open upper end and a lower end closed by a plug member 61, the plug member 61 being mounted in an enlarged end portion 62 of the cylinder barrel 60. This end portion 62 includes a lower chamber 63 in communication with the remainder of the cylinder and a fluid inlet 64. The latter is closed by a non-return valve in the form of a ball 65. Lower chamber 63 is divided into an inner chamber 66 and an outer chamber 67 by an filter 68 of annular cross-section.

The cylinder barrel 60 is rigidly connected to lid 69 by means of two stays 70. The stays 70 pass from lid 69 downwardly parallel to the axis of the cylinder barrel 60, thw lower parts of the stays 70 being bent inwardly towards the cylinder barrel 60 and inserted in holes in end portion 62. The stays 70 extend through these holes into the outer chamber 67. The lower end of the stays 70 are sealingly engaged with the end portion 62 to prevent fluid leakage from the lower chamber 63. One of the stays, 71, is hollow and of tubular form, the upper end of the tubular stay being mounted in lid 69 so as to communicate via a passage 72 with a fluid outlet 73. The other stay 74, is solid.

Cylinder barrel 60 provides a pumping chamber in which is slidable a hollow piston 75 which extends upwardly out of the cylinder barrel and is connected at its upper end to drive plate 76. A piston follower 77 is slidable within piston 75 against a coil spring 78. Coil spring 78 extends from the bottom of hollowed out portion 79 of piston 75. A second coil spring extending from a flange 80 provided on piston follower 77, surrounds narrow portion 81 of piston follower 77. Above flange 80 the piston floower 77 has a diameter slightly wider than the narrow portion 80. As shown piston follower 77 is in its uppermost position relative to piston 75, flange 80 abutting against shoulder 82 of drive plate 76. Further upward movement of piston follower 77 causes drive plate 76 and piston 75 to move upwardly. The upper end of piston follower 77 is rigidly attached to the bottom of sleeve 83 which in turn carries a lever 85 which is pivoted about a point 86 disposed above the upper end of hollow stay 71. Lever 85 may be used for priming the pump.

Referring to FIGS. 1, 2, 5 and 6, the drive means which lifts piston 75 against the bias of coil spring 87, differ from that described in connexion with FIGS. 1 and 2 in that gear wheel 88 carried by the drive output shaft is provided between further gear wheel 89 and transverse block 90. However, functions and relative dispositions of transverse block 90, pin 91 and drive plate 76 are identical with the above described embodiment.

The operation of the piston by the drive means is as described in connexion with the embodiment shown in FIGS. 1 and 2. However, when the piston is operated by means of lever 85, it is possible that the piston follower 77 will be caused to move downwardly at a greater speed than that provided when the piston is being urged by coil spring 87. However, coil spring 78 is chosen such that if an excessive force is applied to piston rod 77 then spring 78 will be compressed by relative movement of piston follower 77 within hollow piston 75. Piston 75 will then be urged downwardly solely by spring 87.

We claim:

1. A drive arrangement for converting rotary motion to linear motion comprising:
    a rotatable member rotatable about an axis;
    a co-operating pin mounted on said rotatable member and spaced from said axis;
    a co-operating cam member mounted on a shaft extending along a line transverse to said axis and rotatable about its own axis;
    said shaft being arranged for movement by the cam member in only one direction along said line; a resilient coil spring mounted coaxially on said shaft for biasing said cam member in an opposite direction along said line; said cam member rotatively mounted on said shaft for movement generally transversely of both said line and said axis of the rotatable member, said coil spring bearing on said shaft so that the movement of said cam member transversely of said line causes said coil spring to wind and unwind, said co-operating pin contacting said cam member directly when said rotatable member rotates with said co-operating pin describing a circular path about said axis of said rotatable member, said cam member moving said shaft longitudinally in said one direction during travel of said pin on a portion of said circular path and disengaged from said cam member when said shaft is moved in said opposite direction by said coil spring during travel of said pin on the remaining portion of said circular path.

2. A piston pump incorporating a drive arrangement according to claim 1, and wherein said shaft is connected to a piston of said pump.

* * * * *